(12) United States Patent
Stanford, Jr. et al.

(10) Patent No.: US 7,146,690 B2
(45) Date of Patent: *Dec. 12, 2006

(54) RELEASABLE FASTENER SYSTEM

(75) Inventors: Thomas B. Stanford, Jr., Port Hueneme, CA (US); Alan L. Browne, Grosse Pointe, MI (US); Nancy L. Johnson, Northville, MI (US); Leslie A. Momoda, Los Angeles, CA (US); William Barvosa-Carter, Ventura, CA (US); Bob R. Powell, Jr., Birmingham, MI (US)

(73) Assignee: General Motors Corporation, Detroit, MI (US)

( * ) Notice: Subject to any disclaimer, the term of this patent is extended or adjusted under 35 U.S.C. 154(b) by 376 days.

This patent is subject to a terminal disclaimer.

(21) Appl. No.: 10/305,375

(22) Filed: Nov. 26, 2002

(65) Prior Publication Data
US 2004/0074062 A1 Apr. 22, 2004

Related U.S. Application Data

(63) Continuation-in-part of application No. 10/273,691, filed on Oct. 19, 2002.

(51) Int. Cl.
*B23P 19/04* (2006.01)
*A44B 21/00* (2006.01)

(52) U.S. Cl. ......................................... 24/451; 428/100
(58) Field of Classification Search ................ 24/442, 24/446, 451, 450, 452, 448, 304; 428/100
See application file for complete search history.

(56) References Cited

U.S. PATENT DOCUMENTS

| 2,717,437 A | 9/1955 | DeMestral | 428/92 |
| 2,994,117 A | 8/1961 | McMullin | 24/201 |
| 3,101,517 A | 8/1963 | Fox et al. | 24/442 |
| 3,128,514 A | 4/1964 | Parker et al. | 24/11 HC |
| 3,138,749 A | 6/1964 | Slibitz | 318/135 |
| 3,176,364 A | 4/1965 | Dritz | 24/306 |
| 3,292,019 A | 12/1966 | Hsu et al. | 310/328 |
| 3,365,757 A | 1/1968 | Billarant | 24/442 |
| 3,469,289 A * | 9/1969 | Whitacre | 24/452 |
| 3,490,107 A * | 1/1970 | Brumlik | 24/451 |

(Continued)

FOREIGN PATENT DOCUMENTS

DE    199 56 011    6/2001

(Continued)

*Primary Examiner*—Jack W. Lavinder
(74) *Attorney, Agent, or Firm*—Kathryn A. Marra

(57) ABSTRACT

A releasable fastener system comprises a loop portion and a hook portion. The loop portion includes a support and a loop material disposed on one side thereof. The hook portion generally includes a support and a plurality of closely spaced upstanding hook elements extending from one side thereof, wherein the plurality of hook elements comprises or incorporates a shape memory alloy fiber. When the hook portion and loop portion are pressed together they interlock to form a releasable engagement. The resulting joint created by the engagement is relatively resistant to shear and pull forces and weak in peel strength forces. Introducing a thermal activation signal to the plurality of hook elements causes a change in shape orientation, flexural modulus property, or a combination thereof that effectively reduces the shear and/or pull off forces in the releasable engagement. In this manner, disengagement of the releasable fastener system provides separation of the hook portion from the loop portion under controlled conditions. Also disclosed herein are processes for operating the releasable fastener system.

11 Claims, 5 Drawing Sheets

U.S. PATENT DOCUMENTS

| | | | |
|---|---|---|---|
| 3,808,648 A | 5/1974 | Billarant et al. ............... 24/450 |
| 4,169,303 A | 10/1979 | Lemelson .................... 24/452 |
| 4,382,243 A | 5/1983 | Babitzka et al. ............ 335/219 |
| 4,391,147 A | 7/1983 | Krempl et al. ................ 73/730 |
| 4,634,636 A | 1/1987 | Yoshino et al. ............. 428/500 |
| 4,637,944 A | 1/1987 | Walker ........................ 428/35 |
| 4,642,254 A | 2/1987 | Walker ........................ 428/36 |
| 4,693,921 A * | 9/1987 | Billarant et al. ............. 428/100 |
| 4,752,537 A | 6/1988 | Das ............................. 428/614 |
| 4,775,310 A | 10/1988 | Fischer ....................... 425/308 |
| 4,794,028 A | 12/1988 | Fischer ....................... 428/100 |
| 4,931,344 A * | 6/1990 | Ogawa et al. .............. 428/100 |
| 5,037,178 A | 8/1991 | Stoy et al. ..................... 385/53 |
| 5,071,363 A | 12/1991 | Reylek et al. ............. 439/291 |
| 5,133,112 A | 7/1992 | Gomez-Acevedo .......... 24/450 |
| 5,136,201 A | 8/1992 | Culp ........................... 310/328 |
| 5,182,484 A | 1/1993 | Culp ........................... 310/328 |
| 5,191,166 A | 3/1993 | Smirlock et al. ........... 89/36.02 |
| 5,212,855 A | 5/1993 | McGanty ..................... 25/452 |
| 5,284,330 A | 2/1994 | Carlson et al. ........ 267/140.14 |
| 5,312,456 A | 5/1994 | Reed et al. .................... 24/442 |
| 5,319,257 A | 6/1994 | McIntyre ................... 310/328 |
| 5,328,337 A | 7/1994 | Kunta ........................ 417/310 |
| 5,474,227 A | 12/1995 | Krengel et al. ............. 228/147 |
| 5,486,676 A | 1/1996 | Aleshin ................. 219/121.63 |
| 5,492,534 A | 2/1996 | Athayde et al. ............. 604/141 |
| 5,497,861 A | 3/1996 | Brotz .......................... 188/267 |
| 5,547,049 A | 8/1996 | Weiss et al. ................. 188/267 |
| 5,611,122 A | 3/1997 | Torigoe et al. ............... 24/442 |
| 5,656,351 A | 8/1997 | Donaruma .................... 428/100 |
| 5,657,516 A | 8/1997 | Berg et al. .................... 24/452 |
| 5,669,120 A | 9/1997 | Wessels et al. ............... 24/446 |
| 5,671,498 A | 9/1997 | Martin et al. .............. 15/244.3 |
| 5,712,524 A | 1/1998 | Suga ........................... 310/328 |
| 5,725,928 A * | 3/1998 | Kenney et al. ............... 24/452 |
| 5,797,170 A | 8/1998 | Akeno ......................... 24/452 |
| 5,798,188 A | 8/1998 | Mukohyama et al. ......... 429/34 |
| 5,814,999 A | 9/1998 | Elie et al. .................... 324/662 |
| 5,816,587 A | 10/1998 | Stewart et al. ........... 280/5.516 |
| 5,817,380 A | 10/1998 | Tanaka ....................... 428/100 |
| 5,885,652 A | 3/1999 | Abbott et al. ............ 427/163.2 |
| 5,945,193 A * | 8/1999 | Pollard et al. ................ 24/452 |
| 5,969,518 A | 10/1999 | Merklein et al. ........... 324/173 |
| 5,974,856 A | 11/1999 | Elie et al. .................. 73/11.04 |
| 5,979,744 A | 11/1999 | Brigleb ..................... 229/87.01 |
| 5,983,467 A | 11/1999 | Duffy ........................... 24/442 |
| 6,029,783 A | 2/2000 | Wirthlin .................. 188/267.1 |
| 6,086,599 A | 7/2000 | Lee et al. ................... 606/108 |
| 6,102,912 A | 8/2000 | Cazin et al. .................. 606/61 |
| 6,102,933 A | 8/2000 | Lee et al. ................... 606/209 |
| 6,129,970 A | 10/2000 | Kenney et al. ............. 428/100 |
| 6,148,487 A | 11/2000 | Billarant ...................... 24/442 |
| 6,156,842 A | 12/2000 | Hoenig et al. .............. 525/171 |
| 6,203,717 B1 | 3/2001 | Munoz et al. ........... 252/62.52 |
| 6,257,133 B1 | 7/2001 | Anderson ............... 100/162 B |
| 6,388,043 B1 | 5/2002 | Langer et al. ................ 528/80 |
| 6,454,923 B1 | 9/2002 | Dodgson et al. ........... 204/415 |
| 6,460,230 B1 * | 10/2002 | Shimamura et al. .......... 24/452 |
| 6,502,290 B1 | 1/2003 | Tseng ........................... 28/161 |
| 6,544,245 B1 | 4/2003 | Neeb et al. ................... 24/442 |
| 6,546,602 B1 * | 4/2003 | Eipper et al. ................. 24/442 |
| 6,593,540 B1 | 7/2003 | Baker et al. ........... 219/121.63 |
| 6,598,274 B1 * | 7/2003 | Marmaropoulos ........... 24/451 |
| 6,605,795 B1 | 8/2003 | Arcella et al. .......... 219/121.63 |
| 6,628,542 B1 | 9/2003 | Hayashi et al. ............. 365/158 |
| 6,681,849 B1 | 1/2004 | Goodson ................... 166/66.5 |
| 6,740,094 B1 | 5/2004 | Maitland et al. ............ 606/108 |
| 6,742,227 B1 | 6/2004 | Ulicny et al. ................. 24/442 |
| 6,766,566 B1 | 7/2004 | Cheng et al. ................. 24/452 |
| 6,797,914 B1 | 9/2004 | Speranza et al. ....... 219/121.64 |
| 6,815,873 B1 | 11/2004 | Johnson et al. ............. 310/331 |
| 2002/0007884 A1 | 1/2002 | Schuster et al. ............ 148/654 |
| 2002/0050045 A1 | 5/2002 | Chiodo ...................... 29/426.5 |
| 2002/0062547 A1 | 5/2002 | Chiodo et al. ............. 29/426.5 |
| 2002/0076520 A1 | 6/2002 | Neeb et al. ................. 428/100 |
| 2002/0142119 A1 | 10/2002 | Seward et al. ............. 428/36.9 |
| 2003/0120300 A1 | 6/2003 | Porter ........................ 606/191 |
| 2004/0025639 A1 | 2/2004 | Shahinpoor et al. .......... 75/722 |
| 2004/0033336 A1 | 2/2004 | Schulte ....................... 428/100 |
| 2004/0074061 A1 | 4/2004 | Ottaviani et al. ............. 24/442 |
| 2004/0074062 A1 | 4/2004 | Stanford et al. .............. 24/442 |
| 2004/0074063 A1 | 4/2004 | Golden et al. ................ 24/442 |
| 2004/0074064 A1 | 4/2004 | Powell et al. ................. 24/442 |
| 2004/0074067 A1 | 4/2004 | Browne et al. ............... 24/442 |
| 2004/0074068 A1 | 4/2004 | Browne et al. ............... 24/442 |
| 2004/0074069 A1 | 4/2004 | Browne et al. ............... 24/442 |
| 2004/0074070 A1 | 4/2004 | Momoda et al. ............. 24/442 |
| 2004/0074071 A1 | 4/2004 | Golden et al. ................ 24/442 |
| 2004/0117955 A1 | 6/2004 | Barvosa-Carter et al. ..... 24/442 |

FOREIGN PATENT DOCUMENTS

| | | |
|---|---|---|
| EP | 0385443 | 9/1990 |
| EP | 0673709 | 9/1995 |
| JP | 401162587 | 6/1989 |
| JP | 4-314446 | 4/1992 |
| JP | 4-266970 | 9/1992 |
| JP | 08260748 | 10/1996 |
| WO | WO 99/42528 | 8/1999 |
| WO | WO 00/62637 | 10/2000 |
| WO | WO 01/84002 | 11/2001 |
| WO | WO 02/45536 | 6/2002 |

* cited by examiner

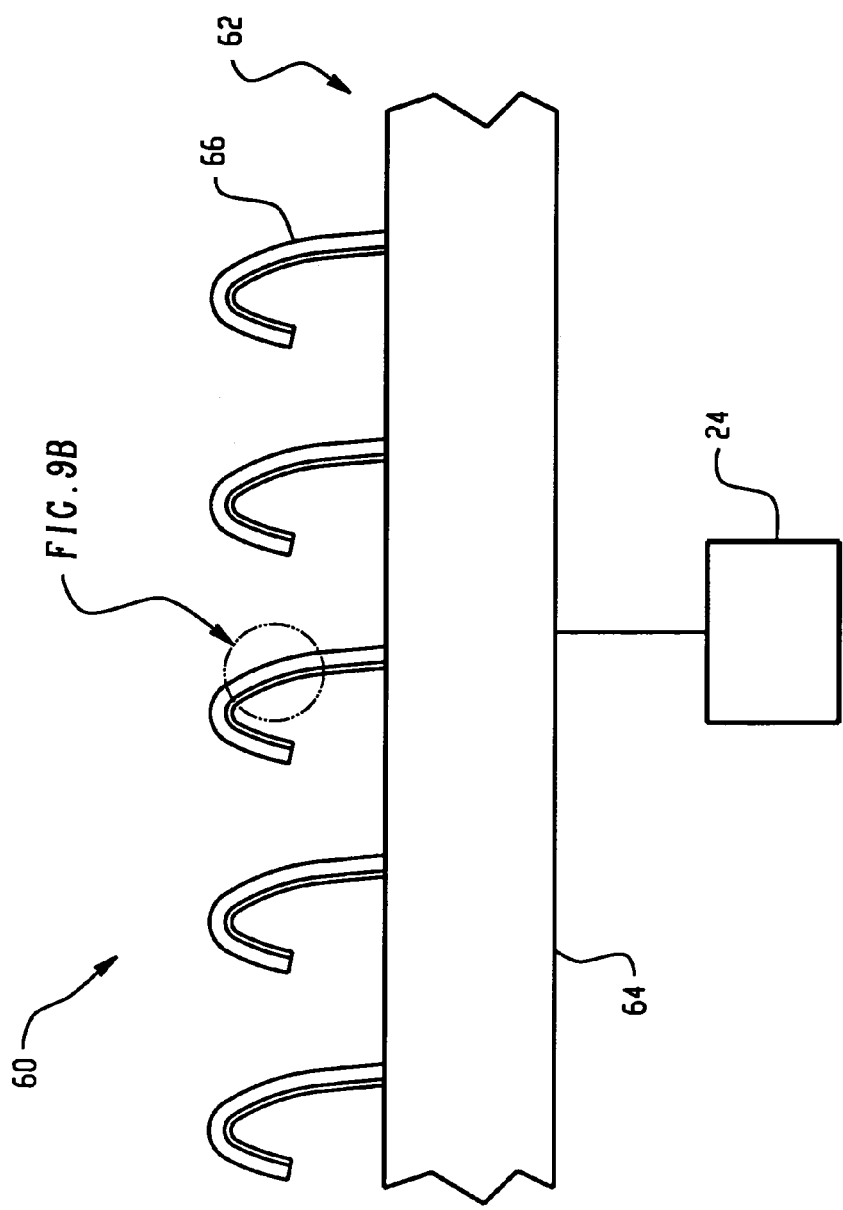

RELEASABLE FASTENER SYSTEM

CROSS REFERENCE TO RELATED APPLICATIONS

This application is a continuation-in-part of U.S. application Ser. No. 10/273,691 filed Oct. 19, 2002, which is fully incorporated herein by reference.

BACKGROUND

This disclosure relates to releasable attachment devices of the type used to fasten, retain, or latch together components of an apparatus or a structure that are to be separated or released under controlled conditions.

Hook and loop type separable fasteners are well known and are used to join two members detachably to each other. These types of fasteners generally have two components disposed on opposing member surfaces. One component typically includes a plurality of resilient hooks while the other component typically includes a plurality of loops. When the two components are pressed together they interlock to form a releasable engagement. The resulting joint created by the releasable engagement is relatively resistant to shear and pull forces, and weak in peel strength forces. As such, peeling one component from the other component can be used to separate the components with a minimal applied force. As used herein, the term "shear" refers to an action or stress resulting from applied forces that causes or tends to cause two contiguous parts of a body to slide relatively to each other in a direction parallel to their plane of contact. The term "pull force" refers to an action or stress resulting from applied forces that causes or tends to cause two contiguous parts of a body to slide relatively to each other in a direction perpendicular to their plane of contact.

Shape memory alloys generally refer to a group of metallic materials that demonstrate the ability to return to some previously defined shape or size when subjected to an appropriate thermal stimulus. Shape memory alloys are capable of undergoing phase transitions in which their flexural modulus, yield strength, and shape orientation is altered as a function of temperature. Generally, in the low temperature, or martensite phase, shape memory alloys can be plastically deformed and upon exposure to some higher temperature will transform to an austenitic phase, or parent phase, returning to their shape prior to the deformation. Materials that exhibit this shape memory effect only upon heating are referred to as having one-way shape memory. Those materials that also exhibit shape memory upon re-cooling are referred to as having two-way shape memory behavior.

BRIEF SUMMARY

Disclosed herein is a releasable fastener system a loop portion comprising a support and a loop material disposed on a surface thereon; a hook portion comprising a support and a plurality of hook elements disposed on a surface thereon, wherein the plurality of hook elements comprises a shape memory alloy fiber; and a thermal activation device coupled to the plurality of hook elements, the thermal activation device being operable to selectively provide a thermal activation signal to the shape memory alloy fiber and change a shape orientation, a yield strength property, a flexural modulus property, or a combination thereof to reduce a shear force and/or a pull-off force of an engaged hook and loop portion.

In another embodiment, the releasable fastener system comprises a loop portion comprising a support and a loop material disposed on a surface thereon, wherein the loop portion comprises shape memory alloy fibers in a spiral shape orientation at a martensite phase temperature and a substantially straightened orientation at an austenite phase temperature; a hook portion comprising a support and a plurality of hook elements disposed on a surface, wherein the plurality of hook elements comprises shape memory alloy fibers in the spiral shape orientation at the martensite phase temperature and a substantially straightened orientation at the austenite phase temperature; and means for changing the shape orientation, the yield strength property, the flexural modulus property, or the combination thereof of the hook elements to reduce a shear force and/or a pull-off force of an engaged hook and loop portion.

In another embodiment, the releasable fastener system comprises a loop portion comprising a support and a loop material disposed on a surface thereon, wherein the loop portion comprises shape memory alloy fibers in a spiral shape orientation at an austenite phase temperature and a reduction in yield strength and/or flexural modulus properties at a martensite phase temperature; a hook portion comprising a support and a plurality of hook elements disposed on a surface, wherein the plurality of hook elements comprises shape memory alloy fibers in the spiral shape orientation at the austenite phase temperature whose yield strength and/or flexural modulus properties are reduced at the martensite phase temperature; and means for changing a temperature of the plurality of hook elements and the loop material upon demand to reduce a shear force and/or a pull-off force of an engaged hook and loop portion.

In another embodiment, the releasable fastener system comprises a loop portion comprising a support and a loop material disposed on a surface thereon; a hook portion comprising a support and a plurality of hook elements disposed on a surface thereon, wherein the plurality of hook elements comprises a shape memory alloy sleeve coupled to an elastic core material; and a thermal activation device coupled to the plurality of hook elements, the thermal activation device being operable to selectively provide a thermal activation signal to the shape memory alloy fiber and change a shape orientation, a yield strength property, a flexural modulus property, or a combination thereof to reduce a shear force and/or a pull-off force of an engaged hook and loop portion.

In another embodiment, a releasable fastener system comprises a loop portion comprising a support and a loop material disposed on a surface thereon; a hook portion comprising a support and a plurality of hook elements disposed on a surface thereon, wherein the plurality of hook elements comprises an elastic sleeve coupled to a shape memory alloy fiber; and a thermal activation device coupled to the plurality of hook elements, the thermal activation device being operable to selectively provide a thermal activation signal to the shape memory alloy fiber and change a shape orientation, a yield strength property, a flexural modulus property, or a combination thereof to reduce a shear force and/or a pull-off force of an engaged hook and loop portion.

In another embodiment, a releasable fastener system comprises a loop portion comprising a support and a loop material disposed on a surface thereon; a hook portion comprising a support and a plurality of hook elements disposed on a surface thereon, wherein the plurality of hook elements comprises an inflexible sleeve and a shape memory alloy fiber disposed within the sleeve, wherein one end of the shape memory alloy fiber is fixedly attached to the support surface and an other end is fixedly attached to an elastic hook, wherein the elastic hook extends from the sleeve in an amount effective to engage the loop material; and a thermal activation device coupled to the plurality of hook elements, the thermal activation device being operable to selectively provide a thermal activation signal to the shape memory alloy fiber and change a length dimension and retract the elastic hook into the sleeve and disengage the elastic hook from the loop material.

In another embodiment, a releasable fastener system comprises a loop portion comprising a support and a loop material disposed on a surface thereon; a hook portion comprising a support and a plurality of hook elements disposed on a surface thereon, wherein each one of the plurality of hook elements comprises one or more shape memory alloy fibers combined with one or more elastic fibers or elements; and a thermal activation device coupled to the plurality of hook elements, the thermal activation device being operable to selectively provide a thermal activation signal to the shape memory alloy fiber and change a shape orientation, a yield strength and/or flexural modulus property, or a combination of these properties of the plurality of hook elements to reduce a shear force and/or a pull-off force of an engaged hook and loop portion.

A hook portion for a releasable fastener system comprises a support; and a plurality of hook elements disposed on a surface of the support, wherein the plurality of hook elements comprise a shape memory alloy fiber adapted to change a shape orientation, a yield strength property, a flexural modulus property, or a combination thereof, upon receipt of an activation signal.

A process for operating a releasable fastener system comprises contacting a loop portion with a hook portion to form a releasable engagement, wherein the loop portion comprises a support and a loop material disposed on a surface thereon, and wherein the hook portion comprises a support and a plurality of hook elements disposed on a surface, wherein the plurality of hook elements comprises a shape memory alloy fiber; maintaining constant shear and pull-off forces in the releasable engagement without introducing an energy signal; selectively introducing the energy signal to the hook elements, wherein the energy signal is effective to change a shape orientation, a yield strength property, a flexural modulus property, or a combination thereof to the plurality of hook elements; and reducing the shear and/or pull off forces in the releasable engagement.

The above described and other features are exemplified by the following figures and detailed description.

BRIEF DESCRIPTION OF THE DRAWINGS

Referring now to the FIGURES, which are exemplary embodiments and wherein like elements are numbered alike:

FIG. 9A is a cross sectional view of hook element in accordance with another embodiment and FIG. 9B is an enlarged perpective view of hook element.

DETAILED DESCRIPTION

Figure 1:
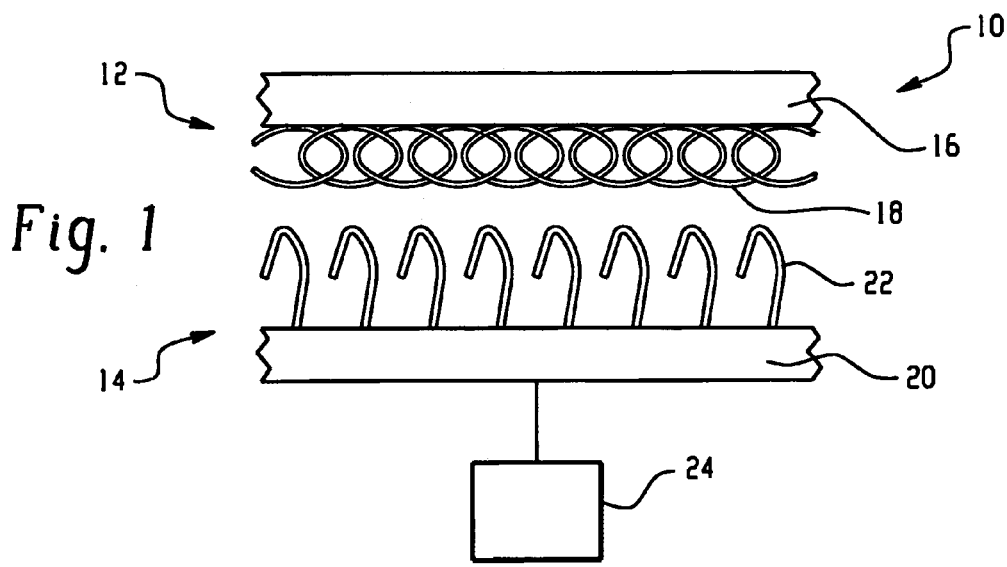
FIG. 1 is a cross sectional view of a releasable fastening system of a first embodiment.

As shown in FIG. 1, a releasable fastener system, generally indicated as 10, comprises a loop portion 12 and a hook portion 14. The loop portion 12 includes a support 16 and a loop material 18 disposed on one side thereof whereas the hook portion 14 includes a support 20 and a plurality of closely spaced upstanding hook elements 22 extending from one side thereof. The hook elements 22 generally comprise or incorporate a fiber, coating, or sheath fabricated from a shape memory alloy, or a fiber, coating, or sheath (i.e., sleeve) of superelastic shape memory alloy. As used herein, the term "fiber" refers to and is interchangeable with a filament or a wire, which fiber may comprise a single strand or multiple strands.

The shape memory alloy provides the hook element 22 with a shape changing capability, a yield strength changing capability, and/or a flexural modulus property change capability to the hook elements 22, as will be described in greater detail. Coupled to and in operative communication with the hook elements 22 is an activation device 24. The activation device 24, on demand, provides a thermal activation signal to the hook elements 22 to cause a change in the shape orientation, yield strength, and/or flexural modulus properties of the hook elements 22. The change in shape orientation, yield strength and/or flexural modulus property generally remains for the duration of the applied thermal activation signal. Upon discontinuation of the thermal activation signal, the hook elements 22 revert to an unpowered state. The illustrated releasable fastener system 10 is exemplary only and is not intended to be limited to any particular shape, size, configuration, number or shape of hook elements 22, shape of loop material 18, or the like. Moreover, the orientation of each hook element may be randomly arranged on the support or may be aligned in the same direction (as shown in FIG. 1).

Figure 2:
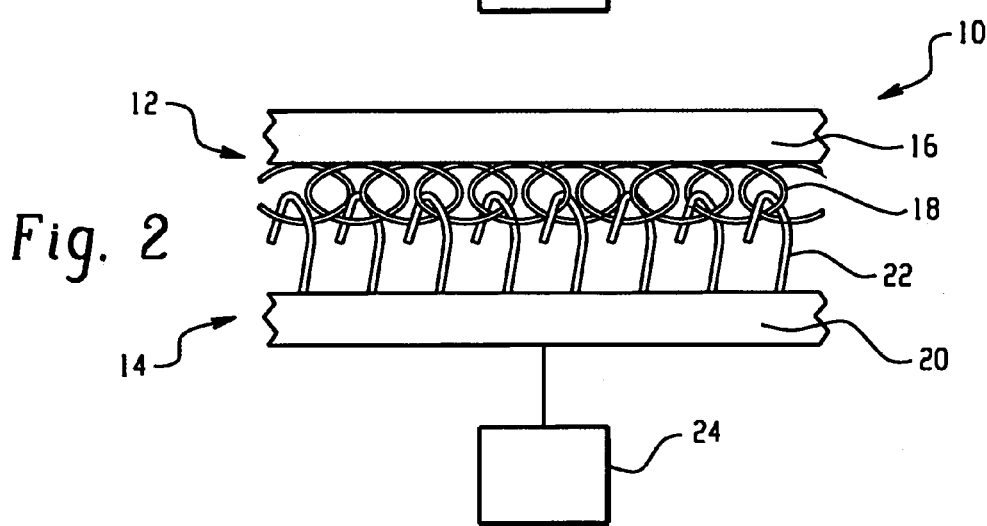
FIG. 2 is a cross sectional view of the releasable fastening system of FIG. 1, wherein the releasable fastening system is engaged.

During engagement, the two portions 12, 14 are pressed together to create a joint that is relatively strong in shear and/or pull-off directions, and weak in a peel direction. For example, as shown in FIG. 2, when the two portions 12, 14 are pressed into face-to-face engagement, the hook elements 22 become engaged with the loop material 18 and the close spacing of the hook elements 22 resist substantial lateral movement when subjected to shearing forces in the plane of engagement. Similarly, when the engaged joint is subjected to a force substantially perpendicular to this plane, (i.e., pull-off forces), the hook elements 22 resist substantial separation of the two portions 12, 14. However, when the hook elements 22 are subjected to a peeling force, the hook elements 22 can become more readily disengaged from the loop material 18, thereby separating the hook portion 12 from the loop portion 14. It should be noted that separating the two portions 12, 14 using the peeling force generally requires that one or both of the supports forming the hook portion and loop portion to be flexible.

Figure 3:
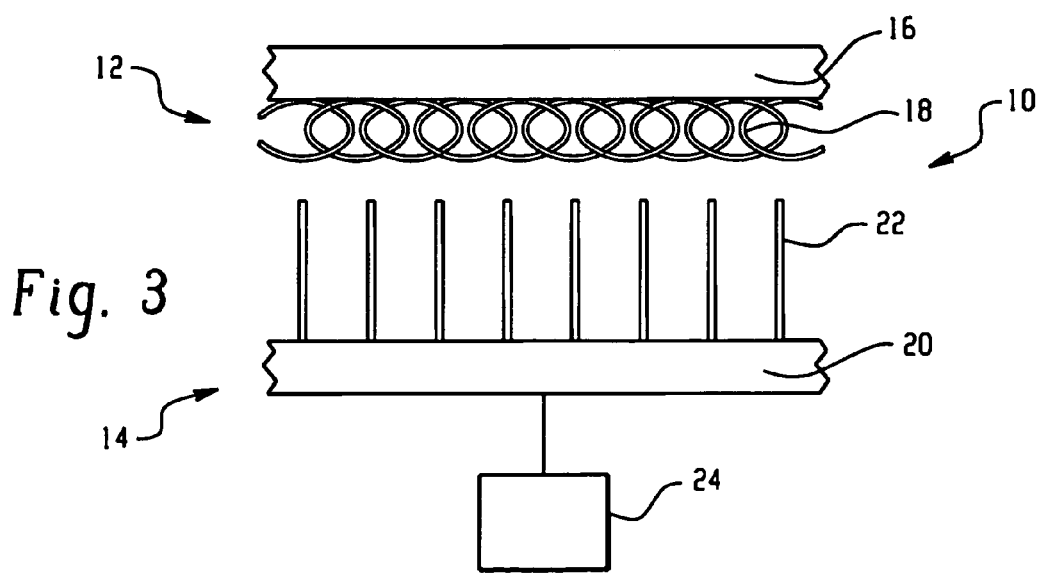
FIG. 3 is a cross sectional view of the releasable fastening system of FIG. 1, wherein the releasable fastening system is disengaged.

To reduce the shear and pull-off forces resulting from the engagement, the shape orientation, yield strength, and/or flexural modulus properties of the hook elements 22 are altered upon receipt of the thermal activation signal from the activation device 24 to provide a remote releasing mechanism of the engaged joint. That is, the change in shape orientation, yield strength, and/or flexural modulus of the hook elements reduces the shearing forces in the plane of engagement, and/or reduces the pull off forces perpendicular to the plane of engagement. However, depending on the hook geometry and direction of shear, the reduction in pull off forces is generally expected to be greater than the reduction in shear forces. For example, as shown in FIGS. 2 and 3, the plurality of hook elements can have inverted J-shaped orientations that are changed, upon demand, to substantially straightened shape orientations upon receiving the thermal activation signal from the activation device 24. The substantially straightened shape relative to the J-shaped orientation provides the joint with marked reductions in shear and/or pull-off forces. Similarly, a reduction in shear and/or pull off forces can be observed by changing the yield strength, and/or flexural modulus of the hook elements. The change in yield strength and/or flexural modulus properties can be made independently, or in combination with the change in shape orientation. For example, changing the flexural modulus properties of the hook elements to provide an increase in flexibility will reduce the shear and/or pull-off forces. Conversely, changing the flexural modulus properties of the hook elements to decrease flexibility (i.e., increase stiffness) can be used to increase the shear and pull-off forces when engaged. Similarly, changing the yield strength properties of the hook elements to increase the yield strength can be used to increase the shear and pull-off forces when engaged. In both cases, the holding force is increased, thereby providing a stronger joint.

Shape memory alloys typically exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is called the austenite finish temperature ($A_f$). When the shape memory alloy is in the austenite phase and is cooled, it begins to change into the martensite phase, and the temperature at which this phenomenon starts is referred to as the martensite start temperature ($M_s$). The temperature at which martensite finishes transforming to martensite is called the martensite finish temperature ($M_f$). Generally, the shape memory alloys are soft and easily deformable in their martensitic phase and are hard, stiff, and/or rigid in the austenitic phase.

Depending on the phase transformation temperatures for the particular shape memory alloy composition, the releasable fastener system can be configured with a variety of capabilities. For example, in a so-called "hot-hold" configuration, the hook elements may be fabricated from shape memory alloys that exhibit an austenite phase at an ambient environmental temperature in which the releasable fastener system is disposed and with a shape effective for engagement with the loop material. Thermal activation would thus require cooling the hook elements to a temperature below the austenite temperature to the martensite phase transformation temperature to cause disengagement. Alternatively, in a so-called "cold-hold" configuration, the hook elements may be fabricated and engaged with the loop portion in a martensite phase, wherein the martensite phase transformation is at or above the ambient environmental conditions in which the releasable fastener system is disposed. Thus, heating the hook elements to an austenite finish temperature would, given the proper materials processing, preferably cause the hook elements to straighten and cause disengagement.

Shape memory alloys can exhibit a one-way shape memory effect, an intrinsic two-way effect, or an extrinsic two-way shape memory effect depending on the alloy composition and processing history. Annealed shape memory alloys typically only exhibit the one-way shape memory effect. Sufficient heating subsequent to low-temperature deformation of the shape memory material will induce the martensite to austenite type transition, and the material will recover the original, annealed shape. Hence, one-way shape memory effects are only observed upon heating. Hook elements formed from shape memory alloy compositions that exhibit one-way memory effects do not automatically reform, and depending on the hook element design, will likely require an external mechanical force to reform the shape orientation that was previously suitable for engagement with the loop portion.

Intrinsic and extrinsic two-way shape memory materials are characterized by a shape transition both upon heating from the martensite phase to the austenite phase, as well as an additional shape transition upon cooling from the martensite phase back to the austenite phase. Hook elements that exhibit an intrinsic shape memory effect are fabricated from a shape memory alloy composition that will automatically reform themselves as a result of the above noted phase transformations. Intrinsic two-way shape memory behavior must be induced in the shape memory material through processing. Such procedures include extreme deformation of the material while in the martensite phase, heating-cooling under constraint or load, or surface modification such as laser annealing, polishing, or shot-peening. Once the material has been trained to exhibit the two-way shape memory effect, the shape change between the low and high temperature states is generally reversible and persists through a high number of thermal cycles. In contrast, hook elements that exhibit the extrinsic two-way shape memory effects are composite or multi-component materials that combine a shape memory alloy composition that exhibits a one-way effect with another element that provides a restoring force to reform the hook-like shape.

In one embodiment, as shown in FIGS. 2 and 3, the hook elements 22 are fabricated from shape memory alloys that exhibit one-way shape memory effects. The hook elements are fixedly attached to support 20 or may be integrally formed with the support 20. The mechanical engagement of the hook portion 14 with the loop portion 12 (as shown in FIG. 1) can be achieved by interaction of the hook elements 22 with the loop material 18 or through physical deformation of suitably arranged hook elements 22 during the face-to-face engagement. That is, each hook element 22 preferably maintains a shape orientation conducive for contact engagement with the loop material 18. Physical deformation may also be employed to provide a shape orientation suitable for the engagement with the loop portion 18. FIG. 2 illustrates the hook element 22 in one such exemplary engagement position. In this position, the shape memory alloy is preferably in the martensite phase. However, upon heating the hook element 22 to a temperature greater than the austenite finish temperature ($A_f$), the hook elements 22 change to substantially straightened shape orientations as shown in FIG. 3. As a result, a marked reduction in shear and pull-off forces can be provided to the releasable fastener system 10 through application of a thermal activation signal. As previously noted, the marked reduction in shear and pull-off forces may also be effected by changes in the yield strength, and/or flexural modulus properties of the hook elements 22.

Alternatively, the shape memory alloy hook elements are coated with a polymer, an elastomer, or a shape memory polymer to increase the stiffness of the hook elements and as such, its hold force at martensite temperature states. The applied polymer or elastomer serves to maintain a nearly constant strain level to the hook element. The polymer or elastomer is preferably selected to provide reversible strains to the hook elements such that upon cooling, the shape memory alloy transforms to the martensite phase, and the elastic strains extant in the polymer or elastomer coating are sufficient to reset the shape of the shape memory alloy element back into the hook shape that existed prior to release. Similar to the behavior of a shape memory alloy, when the temperature is raised through its transition temperature, a shape memory polymer also undergoes a rapid and reversible decrease in yield strength/flexural modulus and change in shape orientation. By coating a shape memory alloy with a shape memory polymer whose transition temperature is below that of the shape memory alloy, it is also possible to reversibly form and reform the hook shape. In this instance, the straightened shape is set by the shape memory alloy above its (higher) transition temperature while the (reformed) hook shape is set by the shape memory polymer above its (lower) transition temperature. Heating therefore causes hook release and as the straightened hook is cooled below the higher temperature, the shape orientation defined by the shape memory alloy reestablishes the hook orientation.

In another embodiment, the superelastic properties of the shape memory alloys can be employed. Superelastic behavior results if the shape memory alloy is deformed at a temperature that is slightly above its transformation temperatures. The superelastic effect is caused by a stress-induced formation of some martensite above its normal temperature. Because it has been formed above its normal temperature, the martensite reverts immediately to an undeformed austenite as soon as the stress is removed. This process provides a very springy, "rubberlike" elasticity in these alloys. In this alternative embodiment, the hook elements 22 are fabricated from a selected shape memory alloy composition that maintains the austenite phase at environmental temperature conditions in which the fastener is to be employed. The shape of the hook elements 22 in the austenite phase would be suitable for engagement with the loop material 18 (e.g., similar to the shape shown in FIG. 2). Cooling the hook elements 22 to a temperature below the austenite phase (i.e., to the martensite phase) reduces the yield strength and/or the flexural modulus of the hook elements, hence reducing the shear and pull off forces relative to those present while the hook elements 22 are engaged with the loop material 18 while in the austenite phase. For example, the shape memory alloy composition can be selected to exhibit an austenite phase at about room temperature. Lowering the temperature of the hook elements 22 below room temperature would cause the hook elements 22 to transform from the stiffer austenite phase to the weaker martensite phase, thereby permitting separation in the shear and/or pull off directions at significantly lower force levels.

Figure 5:
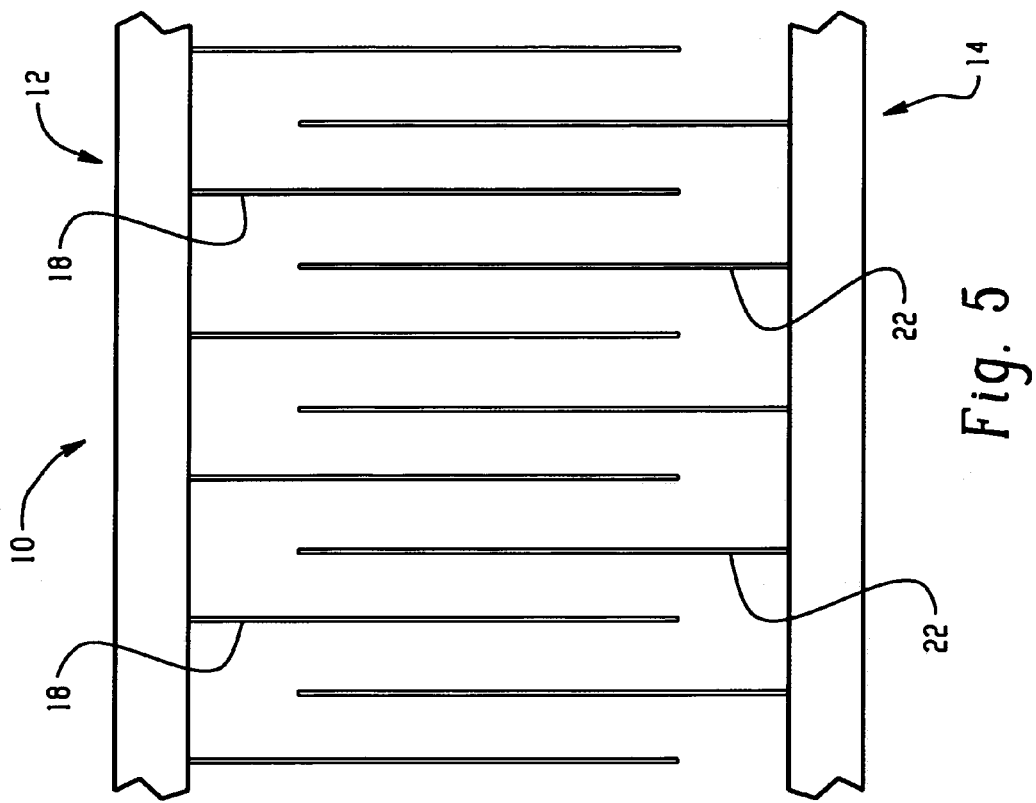
FIG. 5 is a cross sectional view of the engaged releasable fastener system, wherein a loop material and a plurality of hook elements are in a shape orientation suitable for providing the engaged releasable fastener system of FIG. 6 with a reduction in shear and/or pull-off forces.
Figure 4:
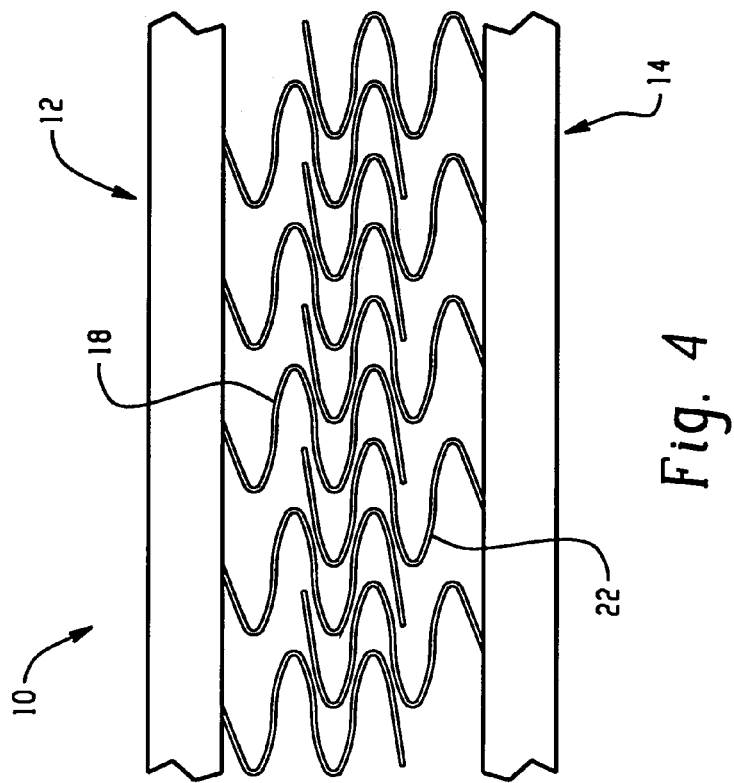
FIG. 4 is a cross sectional view of an engaged releasable fastener system in accordance with another embodiment.

In another embodiment, the hook elements 22 and/or loop material 18 are fabricated from shape memory alloys that preferably exhibit two-way shape memory effects. In this embodiment, both the hook and loop elements receive processing ("training") suitable to produce a reversible shape change that occurs as the hook elements (and/or loop material) transition from the martensite phase to the austenite phase, and vice versa. In this manner, the reversible shape change can be manipulated back and forth between shape orientations suitable for engagement and disengagement. For example, as shown in FIGS. 4 and 5, both the hook elements 22 and the loop material 18 are selected to have a spiral shape orientation, which when pressed together result in an engagement that is relatively strong in shear and pull-off forces and weak in peel forces. Preferably, the hook elements and the loop material are mated together in a straightened shape orientation (FIG. 5), and then allowed to cool to the spiral shape orientation (FIG. 4). As such, instead of being passive, the loop material 18 in this embodiment can be made active upon receipt of an appropriate thermal activation signal. Thermally activating the hook elements 22 and/or loop material 18 can cause a change in shape orientation, yield strength, and/or flexural modulus to provide a marked reduction in shear and pull-off forces required for separation.

Alternatively, the superelastic properties of the shape memory alloy can be employed in a manner similar to that previously described, except that processing to enable two-way behavior in the loop and/or hook elements is not required. In this alternative embodiment, the spirals maintain the spiral shape orientation at the environmental temperature conditions in which the fastener is disposed. Lowering the temperature of the shape memory alloy spirals from the environmental temperature condition (i.e., an austenite phase temperature) to a martensite phase temperature condition causes a significant decrease in the yield strength and/or flexural modulus properties of the spiral. As a result, a marked reduction in shear and pull-off forces is observed. It is noted that the reduction in temperature from the austenite temperature condition to the martensite temperature condition can be made to a selected one of the hook portion 14 and loop portion 12, or to both portions 12, 14 to achieve the reduction in shear and pull-off forces. Applying the thermal activation signal (in this embodiment, the thermal activation signal lowers the temperature) to both portions 12, 14 will cause a further reduction in shear and pull off forces relative to applying the activation signal to a selected one of the hook portion 14 and loop portion 12.

Figure 6:
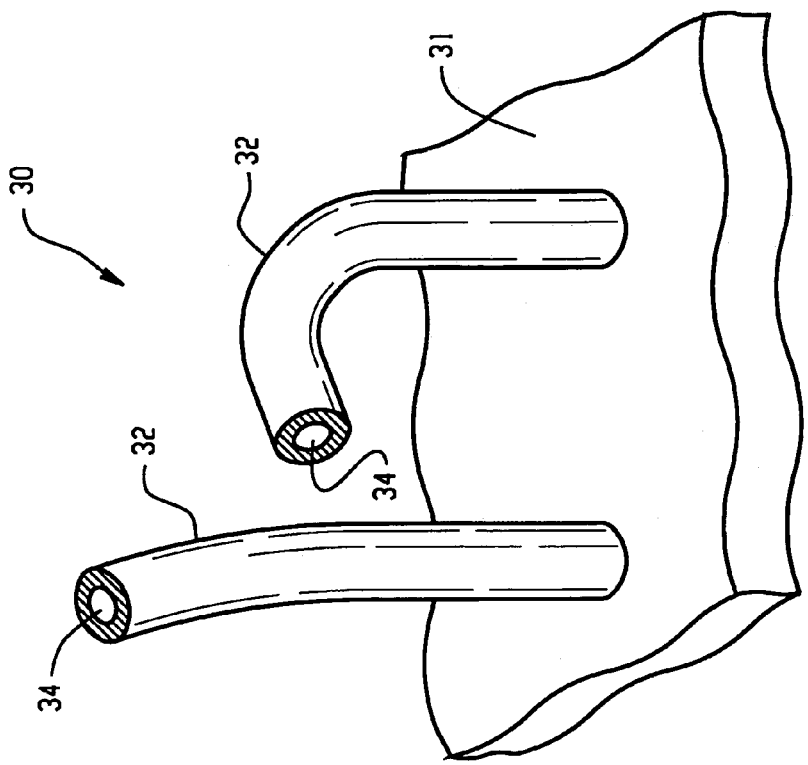
FIG. 6 is a perspective view of a hybrid hook element comprised of a fiber and sleeve, and support.

FIG. 6 illustrates a hybrid shape memory alloy hook element 30 attached to a support 31 in accordance with another embodiment. The hook element 30 generally comprises a shape memory alloy sleeve 32 coupled to a flexible, elastic core material 34. The sleeve and core materials need not be bonded together to provide robust operation. Suitable flexible core materials include shape memory alloys with compositions chosen so that they exhibit superelasticity in the temperature range where the releasable attachment is to be used (i.e. a superelastic material), more commonly available but highly elastic materials such as spring steels, shape memory polymers, elastomers, or other highly elastic fibers or filaments such as carbon fibers. Preferably, the core material is a superelastic material, such as $Ni_xTi_{1-x}$, wherein x is about 56%. In an unpowered state, the hook element 30 is preferably in a shape orientation suitable for engagement with a loop material 18 (as shown in FIG. 1). Applying a thermal activation signal (powered state) to the shape memory alloy causes a change in the shape orientation, yield strength, and/or flexural modulus property of the hook element 30. The selected shape memory alloy composition and/or suitable processing may provide a one-way shape memory effect or a two-way shape memory effect depending on the desired application. In the case of the shape memory alloy sleeve exhibiting only a one-way effect, then the elasticity of the core material may be utilized to enable extrinsic two-way behavior to the hook in order to allow it to return to a shape orientation suitable for re-engagement.

Figure 7:
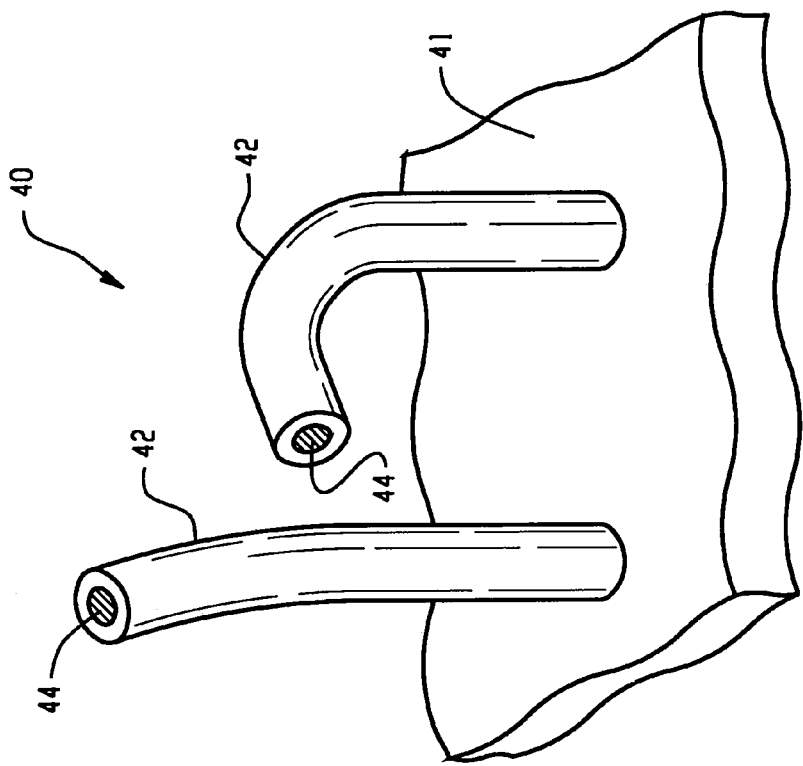
FIG. 7 is a perspective view of a hybrid hook element comprised of a fiber and sleeve, and support, in accordance with another embodiment.

FIG. 7 illustrates a hybrid shape memory alloy hook element 40 attached to a support 41. The hook element 40 comprises a sleeve 42 coupled to a shape memory alloy core 44. The shape memory alloy core 44 is preferably a wire or fiber fabricated from the shape memory alloy. The sleeve and core materials need not be bonded together to provide robust operation. Suitable sleeve materials again include shape memory alloys with compositions chosen so that they exhibit superelasticity in the temperature range where the releasable attachment is to be used (i.e. a superelastic material), more commonly available but highly elastic materials such as spring steel, shape memory polymers, elastomers, or other highly elastic fibers or filaments such as carbon fibers. Superelastic behavior results if the shape memory alloy is deformed at a temperature that is slightly above its transformation temperatures. The superelastic effect is caused by a stress-induced formation of some martensite above its normal temperature. Because it has been formed above its normal temperature, the martensite reverts immediately to an undeformed austenite as soon as the stress is removed. This process provides a very springy, "rubberlike" elasticity in these alloys. At the austenite finish temperature, the shape memory alloy core 34 preferably has a straightened or substantially straightened shape orientation. At the martensite finish temperatures, hook element 40 will preferably revert to a shape configuration suitable for engagement with the loop material. This can be accomplished either through two-way training of the shape memory alloy core, or by release of elastic strain as previously described that is stored in the sleeve material which acts to deform the core material into the appropriate hook shape when cooled back to the martensite phase. Applying a thermal activation signal (powered state) to the hook element 40 to obtain the martensite or austenite shape transformations causes a change in the shape orientation, yield strength, and/or flexural modulus property of the hook element 40.

Figure 8B:
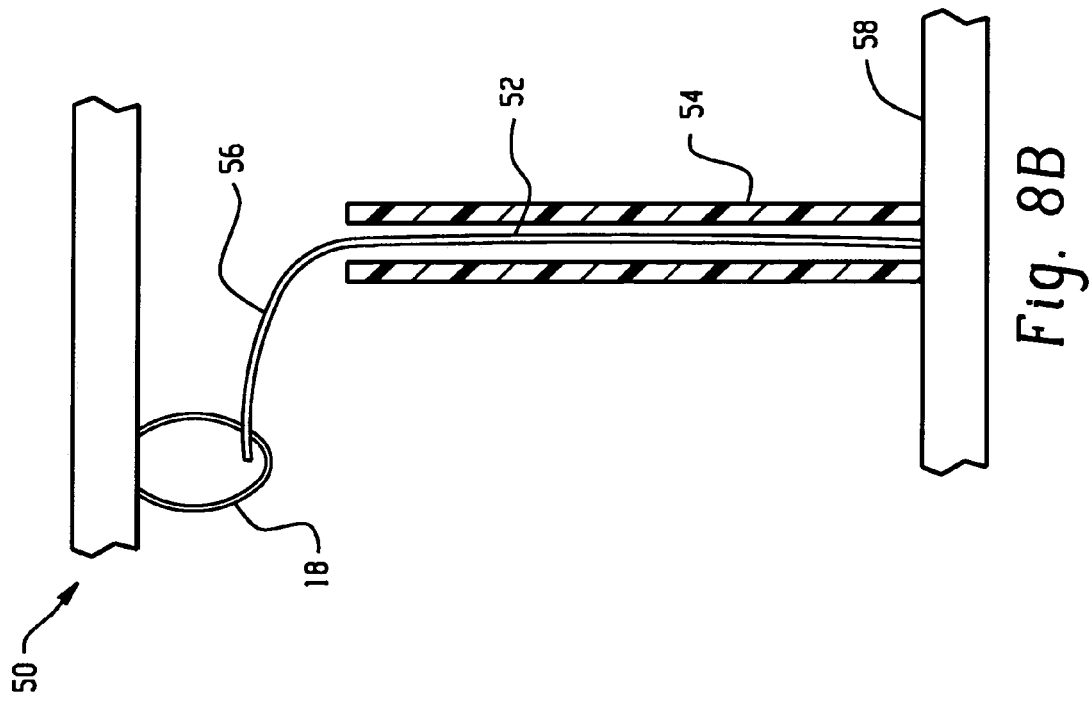
FIGS. 8A and 8B are cross sectional views of a retractable hook element.
Figure 8A:
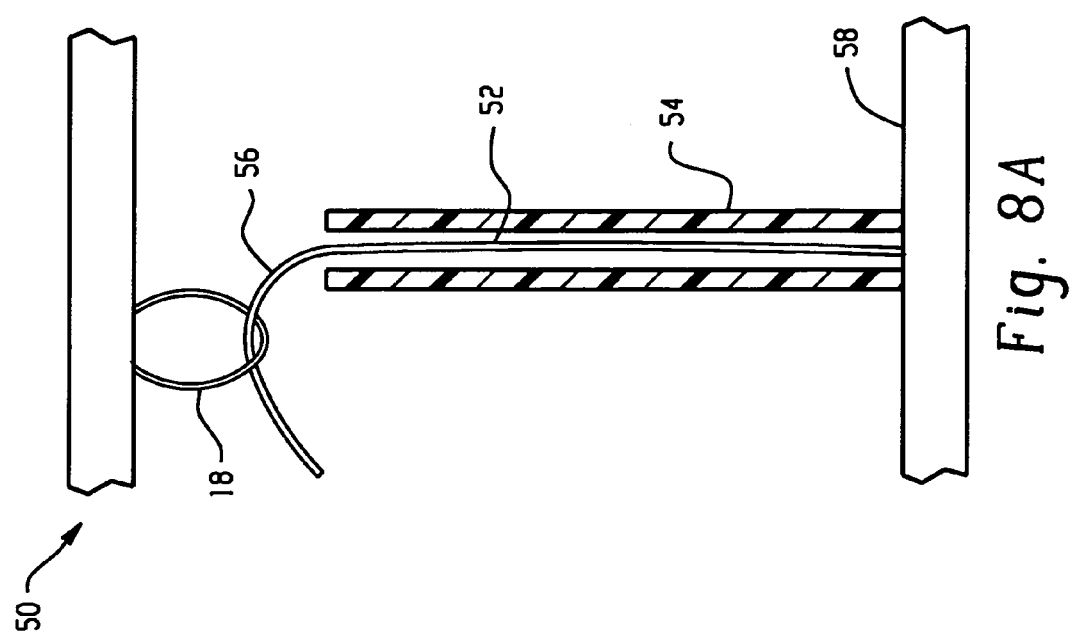

FIGS. 8A and 8B illustrate a retractable hook element 50 in accordance with another embodiment. A shape memory alloy fiber 52 is disposed in a rigid and inflexible sleeve 54, wherein a change in shape orientation of the shape memory alloy fiber comprises a change in a length dimension. Suitable rigid sleeve materials include, but are not limited to, metals, such as steels, aluminum and aluminum alloys, brass, or copper and copper alloys, or stiff polymer materials such as poly(ethylene terephthalate), poly(methyl methacrylate), poly(vinylidene fluoride), polycarbonate, polyamide (nylon), polystyrene, rigid poly-vinyl chloride (PVC), polyimide, and similar high modulus materials. An elastic hook 56 is attached to an end of the shape memory fiber 52. Material for the elastic hook 56 is preferably selected from materials such as superelastic shape memory alloys, spring steels, or elastomers such as polyethylene, silicone, polybutadiene, neoprene, nitrile, and butyl and fluorinated rubbers. The other end of the fiber is attached to a support 58. The shape memory fiber 52 is fabricated from a shape memory alloy composition such that in the martensite phase, a length of the shape memory alloy fiber extends about the length of the sleeve. As such, in the martensite phase, the elastic hook 56 extends from the sleeve and is engaged with the loop material 18. Upon applying a thermal activation signal, the shape memory alloy fiber 52 contracts (i.e., a decrease in the length dimension is observed) and retracts a portion of the elastic hook 56 into the sleeve 54, thereby disengaging the elastic hook 56 from the loop material 18 and providing a reduction in shear and pull forces. Optionally, a plurality of elastic hooks 56 may be attached to a single shape memory fiber 52 and sleeve 54 providing multiple tines for releasable engagement with the loop material 18. Upon cooling, the shape memory alloy fiber will transform back to the martensite phase, and the elastic energy stored in the hook will in turn stretch the shape memory alloy fiber, resetting the hook mechanism for re-engagement with the loop portion.

In another embodiment, as shown in FIG. 9, the releasable fastener system 60 comprises a hook portion 62 comprising a support 64 and a plurality of hook elements 66 disposed on a surface thereon, wherein each of the plurality of hook elements 66 comprises one or more shape memory alloy fibers 68 coupled to an elastic element 70; and a thermal activation device 24 coupled to the plurality of hook elements 66, the thermal activation device 24 being operable to selectively provide a thermal activation signal to the shape memory alloy fiber and change a shape orientation, a yield strength and/or flexural modulus property, or a combination of these properties of the plurality of hook elements to reduce a shear force and/or a pull-off force of an engaged hook and loop portion 12. The number of elastic elements coupled to the single shape memory alloy fiber may be equal to or greater than one depending on the desired application.

There are multiple additional ways in which a shape memory alloy element can be combined with an elastic portion to produce a hook element that exhibits, for example, a two-way behavior. As an example, a straight shape memory alloy fiber in the martensite phase might be adhered, glued, welded, or otherwise attached to a stretched coil or J-shaped elastic portion. This elastic portion could be comprised of a number of materials, including but not limited to, superelastic shape memory alloys, spring or other steels, or other elastic plastic or polymer materials. After attaching the elastic portion to the shape memory alloy fiber, the stretched, elastic portion is allowed to relax, and in the process deforms the attached martensite shape memory alloy fiber. Upon heating, the shape memory alloy fiber will transform to the austenite phase, and cause the coiled or J-shaped elastic portion to straighten. Conversely, a shape memory alloy fiber that has been pre-stretched while in the martensite phase could be attached to a straight elastic portion. Depending on the geometry of attachment and the initial shape orientation of the elastic portion, upon heating and transforming the shape memory alloy fiber to the austenite phase, the combined hook element will change shape to a spiral or other hook-like shape suitable for engagement. The superelasticity property of shape memory alloys can also be utilized to provide release upon cooling. For instance, a superelastic shape memory alloy fiber in the austenite phase that has been pre-shaped to take on a hook geometry can be stretched and bonded to an initially straight elastic element. Upon cooling, the superelastic shape memory alloy fiber will transform from the austenite to the easily deformable martensite phase, and the elastic portion will deform the shape memory alloy fiber, causing the combined hook element to straighten or take on geometry suitable to reduce the pull-off and/or shear forces. Other geometrical possibilities include multiple elastic portions attached symmetrically or asymmetrically to the shape memory alloy fiber, in order to bias the shape change to occur between optimal hook (hold) and straight (release) shapes.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the hook elements with shape memory effects, superelastic effects, and high damping capacity.

Suitable shape memory alloy materials for fabricating the hook elements and/or sheath include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, and the like. A preferred shape memory alloy is a nickel-titanium based alloy commercially available under the trademark NITINOL from Shape Memory Applications, Inc.

The shape memory alloy fibers may be formed integrally with support, or more preferably, may be attached directly to the support. For example, an adhesive can be applied (e.g., silver-doped epoxy) to the substrate and the shape memory alloy hook elements can be mechanically pressed into the adhesive. Alternatively, vapor grown shape memory alloy fibers can be deposited directly from a gas phase onto a support. Suitable support materials include, but are not intended to be limited to, metals (such as superelastic NiTi) plastics (such as polyethylene filaments) or fabrics. Preferably, the thickness of the shape memory alloy fiber is chosen to provide resiliency and flexibility to the hook elements for those applications requiring a change in shape orientation, yield strength, and/or flexural modulus. In those applications requiring a length dimension change, the thickness is preferably suitable for providing an effective length change at sufficient force levels to achieve actuation. The thickness of the shape memory alloy fiber should also be of a thickness effective to provide the desired shape memory effect. Although the shape of the fiber depicted in the Figures is generally cylindrical, other shapes are suitable such as, for example, fibers having a cross-sectional shape of an oval, a cross, a square, a rectangle, and the like. As such, the fibers 23 are not intended to be limited to any particular shape.

In practice, the spacing between adjacent hook elements is in an amount effective to provide the hook portion with sufficient shear and/or pull off resistance desired for the particular application during engagement with the loop portion. Depending on the desired application, the amount of shear and/or pull-off force required for effective engagement can vary significantly. Generally, the closer the spacing and the greater amount of the hook elements employed will result in increased shear and/or pull off forces upon engagement. The hook elements preferably have a shape configured to become engaged with the loop material upon pressing contact of the loop portion with the hook portion, and vice versa. As such, the hook elements are not intended to be limited to any particular shape. In the engaged mode, the hook elements can have an inverted J-shaped orientation, a mushroom shape, a knob shape, a multi-tined anchor, T-shape, spirals, or any other form of a hook-like element used for separable hook and loop fasteners. Such elements are referred to herein as "hook-like", "hook-type", or "hook" elements whether or not they are in the shape of a hook. Likewise, the loop material may comprise a plurality of loops or pile, a shape complementary to the hook element (e.g., a key and lock type engagement), or any other form of a loop-like element used for separable hook and loop fasteners.

The arrays of hook elements of various geometries and/or loop material on the respective supports are to be so arranged and sufficiently dense such that the action of pressing the two portions together results in the mechanical engagement of the hook elements with the loop material creating a joint that is strong in shear and pull-off forces, and relatively weak in peel. Remote disengagement of the two portions is effected variously by raising the temperature of the shape memory alloy above its transformation temperature causing the hook elements to straighten (e.g. in those examples in which the shape memory property of the shape memory alloy is employed), and/or by lowering the temperature of the shape memory alloy to effect a switch from the stiffer austenite to the weaker martensite phase (e.g. in those examples in which the superelasticity property of shape memory alloys is employed). In this manner, changing the shape orientation, yield strength, and/or flexural modulus properties of the hook elements can be used to provide on-demand remote engagement and disengagement of joints/attachments.

The loop material generally comprises a random looped pattern or pile of a material. The loop material is often referred by such terms as the "soft", the "fuzzy", the "pile", the "female", or the "carpet". Suitable loop materials are commercially available under the trademark VELCRO from the Velcro Industries B.V. Materials suitable for manufacturing the loop material include thermoplastics such as polypropylene, polyethylene, polyamide, polyester, polystyrene, polyvinyl chloride, acetal, acrylic, polycarbonate, polyphenylene oxide, polyurethane, polysulfone, and the like. The loop material 18 may be integrated with the support or may be attached to the support.

Alternatively, the loop material can be fabricated from the same shape changing, yield strength changing, and/or flexural modulus changing materials employed for the hook elements as previously discussed. As such, instead of being passive, the loop material can be made active upon receipt of an activation signal.

The supports for the various loop and hook portions may be rigid or flexible depending on the intended application. Suitable materials for fabricating the support include plastics, fabrics, metals, and the like. For example, suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers. An adhesive may be applied to the backside surface of the support (the surface free from the hook elements 22 or loop material) for application of the releasable fastener system to an apparatus or structure. Alternatively, the releasable fastener system may be secured to an apparatus or structure by bolts, by welding, or any other mechanical securement means. It should be noted that, unlike traditional hook and loop fasteners, both supports could be fabricated from a rigid or inflexible material in view of the remote releasing capability provided. Traditional hook and loop fasteners typically require at least one support to be flexible so that a peeling force can be applied for separation of the hook and loop fastener.

The support may also comprise the activation device for providing the thermal activating signal to the hook elements and/or loop material depending on the particular design of the releasable fastener system. For example, the support may be a resistance type-heating block to provide a thermal energy signal sufficient to cause a shape change and/or change in yield strength, or flexural modulus properties.

The shape memory material coated or deposited onto the fibers may be activated by any suitable means, i.e., a thermal activation signal, preferably a means for subjecting the material to a temperature change above, or below, a transition temperature. For example, for elevated temperatures, heat may be supplied using hot gas (e.g. air), steam, or electrical current. The activation means may, for example, be in the form of a heated room or enclosure, or an iron for supplying heat, a hot air blower or jet, means for passing an electric current through, or inducing an electrical current in (e.g. by magnetic or microwave interaction), the shape memory material (or through or in an element in thermal contact therewith). In the case of a temperature drop, heat may be extracted by using cold gas, a thermoelectric element, or evaporation of a refrigerant. The activation means may, for example, be in the form of a cool room or enclosure, a cooling probe having a cooled tip, a control signal to a thermoelectric element, a cold air blower or jet, or means for introducing a refrigerant (such a liquid nitrogen) to at least the vicinity of the shape memory material.

Shape setting or training of the hook elements can be made by constraining to the hook element on a mandrel or fixture of the desired shape and applying an appropriate heat treatment. The shape can also be imparted by surface treatments such as application of high-energy beams from ion or laser sources or other mechanical means such as by shot peening or polishing. The heat treatment methods used to set the shape in both shape memory and superelastic forms of the shape memory alloy are similar. The heat treatment parameters chosen to set both the shape and the properties of the hook elements usually need to be determined experimentally. For example, shape setting nickel titanium shape memory alloys generally requires a temperature greater than about 400° C. for a period of time greater than about 1 minute. Rapid cooling of some form is preferred via a water quench or rapid air cool (if both the parts and the fixture are small). Higher heat treatment times and temperatures will increase the actuation temperature of the part and often gives a sharper thermal response (in the case of shape memory elements). Alternatively, if intrinsic two-way operation is desired, the shape memory alloy may be cooled below $M_f$ and bent to a desired shape. The hook element is then heated to a temperature above $A_f$ and allowed freely to take its austenite shape. The procedure is repeated about 20 to about 30 times, which completes the training. The sample now assumes its programmed shape upon cooling under $M_f$ and to another shape when heated above $A_f$. In another embodiment, the hook element is bent just above $M_s$ to produce the preferred variants of stress-induced martensite and then cooled below the $M_f$ temperature. Upon subsequent heating above the $A_f$ temperature, the specimen takes its original austenitic shape. This procedure is repeated about 20 to about 30 times.

The shape memory material may be activated by any suitable means, preferably a means for subjecting the material to a temperature change above, or below, a transition temperature. For example, for elevated temperatures, heat may be supplied using hot gas (e.g. air), steam, or electrical current. The activation means may, for example, be in the form of a heated room or enclosure, an iron for supplying heat, a hot air blower or jet, means for passing an electric current through, or inducing an electrical current in (e.g. by magnetic or microwave interaction), the shape memory material (or through or in an element in thermal contact therewith). In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

It will be appreciated that any number of different products or structural elements can be disassembled using this technique. It is not necessary to know and physically locate the exact position of each fastener of a product. Instead, it is simply necessary to know the transition temperature of the shape memory material utilized within the products, to enable the material to be "activated".

The disclosure is further illustrated by the following non-limiting examples.

EXAMPLES

In this Example, a hook portion was fabricated from a nickel-titanium (NiTi) shape memory alloy. A 200 μm thick NiTi shape memory alloy wire with a austenite finish transition temperature of 70° C. was woven into a metallic mesh (approximately 1 millimeter mesh spacing) and around a ceramic rod mandrel of radius 1.25 millimeter (mm). The rod was removed and the shape memory alloy wire loops were fixed to the back of the mesh using an epoxy. After the epoxy was cured, the loops were cut near the base of one side of each loop to form an array of hook elements. A 15 to 20 watt heating element was affixed to the back of the metal mesh. The hook portion was pressed in face-to-face engagement with a loop portion consisting of a Velcro® loop material commercially available from the Velcro Corporation, resulting in a mechanical engagement resistant to shear and pull off forces, and weak in peel forces. Upon heating, the array of hook elements straightened, significantly reducing the shear and pull off forces. Force levels were found to be comparable to commercial Velcro®, at about 4 to about 5 pounds per square inch (psi) pull-off force prior to activation (heating) and 0.005 psi after heating. Re-engagement with the loop surface was accomplished by applying sufficient force between the parts to re-deform the shape memory hook elements and entangle them in the loop material. The process was found to be highly repeatable, having been cycled >50 times.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A releasable fastener system comprising:
a loop portion comprising a support and a loop material disposed on a surface thereon;
a hook portion comprising a support, and a plurality of hook elements attached to the support, wherein the plurality of hook elements comprise a first portion fabricated from a shape memory alloy and a second portion fabricated from a different shape memory alloy; and
an activation device coupled to the plurality of hook elements, the activation device being operable to selectively provide an activation signal to the plurality of hook elements to change a shape orientation, a yield strength property, a flexural modulus property, or a combination thereof to reduce a shear force and/or a pull-off force of an engaged hook and loop portion.

2. The releasable fastener system of claim 1, wherein the shape memory alloy comprises nickel-titanium based alloys, indium-titanium based alloys, nickel-aluminum based alloys, nickel-gallium based alloys, copper based alloys, gold-cadmium based alloys, iron -platinum based alloys, iron-palladium based alloys, silver-cadmium based alloys, indium-cadmium based alloys, manganese-copper based alloys, or combinations comprising at least one of the foregoing alloys.

3. The releasable fastener system of claim 1, wherein the shape memory alloy comprises an alloy composition selected to exhibit an austenite phase at an environmental temperature in which the fastener system is disposed and a martensite phase at about a temperature lower than the environmental temperature.

4. The releasable fastener system of claim 1, wherein the shape memory alloy comprises an alloy composition selected to exhibit a martensite phase at an environmental temperature in which the fastener system is disposed and an austenite phase at a temperature greater than the environmental temperature.

5. The releasable fastener system of claim 1, wherein the loop material comprises a shape memory alloy fiber comprising a spiral shape orientation at a martensite temperature condition and a substantially straightened orientation at an austenite temperature condition, and wherein the plurality of hook elements comprise a spiral shape orientation at the martensite temperature condition and a substantially straightened orientation at the austenite temperature condition.

6. The releasable fastener system of claim 1, wherein the plurality of hook elements comprise a shape orientation comprising a J-shaped orientation, a mushroom shape, a knob shape, a multi-timed anchor shape, a T-shape, a spiral shape, or combinations comprising at least one of the foregoing shapes.

7. The releasable fastener system of claim 1, wherein the plurality of hook elements further comprises a polymer coating about the shape memory alloy.

8. The releasable fastener system of claim 7, wherein the polymer comprises an elastomer or a shape memory polymer.

9. The releasable fastener system of claim 7, wherein the hook portion support and the loop portion support comprise an inflexible material.

10. The releasable fastener system of claim 7, wherein the shape memory alloy exhibits a one-way shape memory effect.

11. The releasable fastener system of claim 7, wherein the shape memory alloy exhibits a two-way shape memory effect.

* * * * *